(12) United States Patent
Fendt et al.

(10) Patent No.: US 6,249,558 B1
(45) Date of Patent: Jun. 19, 2001

(54) METHOD FOR TRANSMITTING DIGITAL DATA IMPULSES

(75) Inventors: Guenter Fendt; Stefan Schaeffer, both of Schrobenhausen; Michael Bischoff, Adelschlag; Werner Nitschke, Ditzingen; Johannes Rinkens, Ingolstadt; Otto Karl, Leonberg; Joachim Bauer, Oberstenfeld, all of (DE)

(73) Assignees: Temic Telefunken Microeletronic GmbH, Heilbronn; Robert Bosch GmbH, Stuttgart, both of (DE)

( * ) Notice: Subject to any disclaimer, the term of this patent is extended or adjusted under 35 U.S.C. 154(b) by 0 days.

(21) Appl. No.: 09/280,729

(22) Filed: Mar. 29, 1999

(30) Foreign Application Priority Data

Mar. 28, 1998 (DE) .............................................. 198 13 965

(51) Int. Cl.⁷ ...................................................... H04L 7/02
(52) U.S. Cl. .......................... 375/361; 375/282; 375/333
(58) Field of Search .................................... 375/282, 293, 375/333, 354, 356, 361, 364, 371; 348/526; 341/70, 71

(56) References Cited

U.S. PATENT DOCUMENTS

| 3,309,463 | 3/1967 | Roedl . |
| 4,827,341 | * 5/1989 | Akimoto et al. ...................... 348/526 |
| 5,052,026 | 9/1991 | Walley . |
| 5,594,763 | * 1/1997 | Nimishakavi ........................ 375/376 |
| 5,612,681 | * 3/1997 | Funahashi et al. ............. 340/825.21 |
| 5,787,132 | 7/1998 | Kishigami et al. . |
| 5,969,631 | 10/1999 | Ammler et al. . |

FOREIGN PATENT DOCUMENTS

| 4224508 | 1/1994 | (DE) . |
| 0178622 | 4/1986 | (EP) . |
| 0185556 | 6/1986 | (EP) . |
| 0425302 | 5/1991 | (EP) . |
| 0813321 | 12/1997 | (EP) . |

\* cited by examiner

Primary Examiner—Young T. Tse
(74) Attorney, Agent, or Firm—W. F. Fasse; W. G. Fasse (57) ABSTRACT

Before digital data impulses are transmitted from a transmitter to a receiver that includes a data acquisition signal generator, at least one synchronizing impulse (syn1, . . . ) is transmitted for synchronizing the transmitter with the receiver with regard to a sync frequency that is repeatedly updated to provide a current accepted sync frequency. The at least one synchronizing impulse and the data impulses are Manchester encoded which combines timing (synchronizing) and data signals. An impulse flank change occurring centrally in an impulse width is used as a synchronization point of time. Stepping pulses occurring between two consecutive synchronization points of time are counted and the resulting count is used to determine the sync frequency in response to the occurrence of a synchronizing impulse and at a synchronization point of time. A time shift or delay occurs between data impulses and synchronization points of time. This delay is taken into account by a corresponding time shift in the scanning of the logic levels "0" and "1" of the data impulses. This type of signal transmission is especially suitable for a signal bus in a passenger protection system.

16 Claims, 4 Drawing Sheets

METHOD FOR TRANSMITTING DIGITAL DATA IMPULSES

CROSS-REFERENCE TO RELATED APPLICATION

This application is related to U.S. Ser. No. 08/876,574, filed on Jun. 16, 1997 now U.S. Pat. No. 5,969,631, for: METHOD AND CONTROL SYSTEM FOR THE SYNCHRONIZED TRANSMISSION OF DIGITAL DATA.

PRIORITY CLAIM

This application is based on and claims the priority under 35 U.S.C. §119 of German Patent Application 198 13 965.9, filed in the German Patent Office on Mar. 28, 1998. The entire disclosure of the German application is incorporated herein by reference.

FIELD OF THE INVENTION

The invention relates to a method for transmitting digital data impulses between a transmitter and a receiver. The receiver includes a data acquisition signal generator (DASG) which is controllable in an open-loop manner for synchronizing the DASG with the data transmission.

BACKGROUND INFORMATION

European Patent Publication EP 0,813,321 A2 which claims the priority of two German Patent Publications DE 196 23 750 and DE 196 43 205, discloses a method for transmitting digital data impulses having two logic levels "0" and "1". The just mentioned publication teaches the provision of a data acquisition frequency with the help of a high frequency oscillator clock signal, whereby the high frequency clock signal is ascertained from an impulse duration. According to the known method it is possible to cause a data acquisition signal generator (DASG), the acquisition frequency of which is controllable in an open loop manner, to track the transmission frequency of a transmitted signal or to equalize any frequency tolerance fluctuations by means of simple RC-oscillators. On the one hand, the high frequency clock signals, simply referred to as clock signals or clock frequency are used for acquiring a time duration of an impulse from which the acquisition frequency is derived. On the other hand, the clock signals are also serving as a stepping frequency for advancing counters which generate, upon reaching of threshold values, the system and data acquisition frequency. The threshold values on their part may also be derived from the clock signals, for example as portions of the time duration of one impulse.

However, a permanent follow-up or intermediate synchronization is not possible with a conventional bit sequence of digital data impulses having unknown impulse levels. Thereby, it is conventionally necessary to repeatedly perform a new synchronization after a known number of data impulses, by using new synchronization impulses.

The disclosure of EP 0,813,321 also discloses a further development for pulse width modulated signals, whereby each data impulse is provided with its pulse flank change which in turn makes possible a follow-up synchronization through the data impulses. A transformation of digital data impulses into a pulse width modulation, however, is rather subject to a substantial effort and expense and is thus not feasible for all applications.

Moreover, encoding methods for digital data impulses are known in the art which involve encoding that permits clock signal recovery. Especially the Manchester encoding method involves recoverable clock signals. Manchester encoding combines timing or synchronizing signals with data signals.

European Patent Publication EP 0,178,622 A2 discloses a method for the clock signal recovery in connection with a Manchester encoded data transmission with a voltage controlled oscillator (VCO) including a frequency divider, selector means and a phase detector. European Patent Publication EP 0,185,556 A2 and European Patent Publication 0,425,302 A2 disclose methods for the clock signal recovery for Manchester encoded signals or for a digital closed loop phase decoder (Phasenregelschleifendecoder).

The Manchester encoding method is very advantageous due to its ability to recover clock signals. However, Manchester encoding cannot be employed in certain prior art methods that transmit digital data impulses to a data acquisition signal generator (DASG). In the Manchester encoding method the impulse flank change takes place within a data impulse width between an inverted impulse half and a non-inverted impulse half. A flank change may not take place at the beginning or end of an impulse width if Manchester encoding is to be applied. For the above mentioned conventional method it is necessary that the impulse flank change takes place at the beginning or at the end of a data impulse width for ascertaining the clock frequency from the time duration of an impulse width. Hence, in the above described conventional methods it is not possible to use Manchester encoding.

OBJECTS OF THE INVENTION

In view of the foregoing it is the aim of the invention to achieve the following objects singly or in combination:

- to cause a follow-up or intermediate synchronization of the data acquisition signal generator, whereby such follow-up synchronization is derived from synchronization impulses or a sync frequency or from data impulses or a data frequency by simple steps;
- to avoid the need for using the time duration between the beginning and end of a single synchronization or data impulse as the base for deriving a clock frequency and/or an acquisition frequency;
- to perform the synchronization centrally within a synchronization or data impulse where the impulse flank change takes place, so that a time duration between two impulse flank changes for counting stepping pulses from a stepping oscillator may extend over two consecutive impulses;
- to use the point of time where an impulse flank change takes place as a synchronization point of time;
- to use the time duration between two synchronization points of time for ascertaining a clock frequency or acquisition frequency even if these points of time are positioned in the center of two consecutive impulses;
- to derive a current clock frequency or acquisition frequency by counting oscillator generated stepping pulses falling within the duration between two impulse flank changes, whereby the stepping pulse frequency is higher than the clock frequency and the acquisition frequency; and
- to provide a digital data transmission method which is especially suitable for use in digital signal bus systems as part of passenger protection devices in passenger vehicles.

SUMMARY OF THE INVENTION

The method of the invention combines the following steps for transmitting digital data impulses having two logic levels "0" or "1" from a transmitter (T) to a receiver (R), wherein the receiver includes a data acquisition signal generator (DASG) having a controllable data acquisition frequency.

(a) Manchester encoding said data impulses so that each data impulse has a not inverted impulse half and an inverted impulse half with an impulse flank change between the two data impulse halves, (b) providing and Manchester encoding synchronization impulses so that each synchronization impulse has a not inverted impulse half and an inverted impulse half with an impulse flank change between the two synchronization impulse halves, (c) sending, prior to any data impulse transmission, at least one Manchester encoded synchronization impulse for synchronizing said data acquisition signal generator with respect to time and with respect to a sync frequency provided by said at least one synchronization impulse, which remains current for at least one data impulse next to be transmitted, (d) defining by each impulse flank change a synchronization time point, whereby a time duration determined by two sequential synchronization time points represents a current impulse frequency, (e) generating a stepping frequency to provide counter stepping pulses SP, so that said stepping frequency is larger than said current impulse frequency, (f) performing said synchronizing of said data acquisition signal generator by stepping a counter with said stepping pulses during said time duration to provide a count of stepping pulses, (g) deriving from said count of stepping pulses a current accepted sync frequency ($T_{akt}$), (h) deriving from said current accepted sync frequency a current data acquisition frequency for controlling said data acquisition signal generator, (i) scanning said logic levels of said data impulses in response to said current data acquisition frequency and said synchronization time points, and (j) performing a follow-up or intermediate synchronization of said data acquisition signal generator in response to deviations of said stepping frequency and/or of said synchronization time points and/or of following impulse durations of following data impulses.

It is a basic requirement for practicing the method of the invention to depart from using the time duration or pulse width of a single synchronization or data impulse as the time duration that represents the clock frequency. Instead, the invention consistently employs the characteristics of the Manchester encoding so that the time duration between two pulse flank changes spans two consecutive impulses. However, the synchronization according to the present method takes place centrally within a synchronizing or data impulse, where synchronization is always and precisely possible because at this point the impulse flank change takes place at a precise point of time. Hence, the invention uses this flank change point of time as the synchronization point of time. The time duration representing the clock frequency is now precisely defined as the time duration between two synchronization points of time, namely between two flank changes, even though this duration extends over two impulse halves of two consecutive synchronization impulses or data impulses.

The current frequency is derived by counting stepping pulses generated by an oscillator between two consecutive synchronization points of time. The data acquisition signal generator (DASG) is controlled in its data acquisition by the derived current frequency at the synchronization point of time that is in the impulse center. However, the impulse level acquisition takes place with a time delay relative to the synchronization point of time, whereby the data acceptance generator adapts itself to the respective synchronization point of time and is thus synchronized.

In order to fully utilize the advantage of the Manchester encoding, namely the single bit error recognition, both impulse halves are scanned or sampled at least once prior to a pulse flank change and once after a pulse flank change, that is, prior to and after the synchronization point of time. Preferably, the scanning or sampling takes place as a multi-sampling or multi-scanning within a scanning window to be explained in more detail below.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

The term synchronization a used herein has been shortened to sync, e.g. sync frequency. The following definitions for the various frequencies here involved are used in this text. A sync frequency is derived from a sync pulse duration. A data frequency is derived from a data pulse duration. Preferably the sync frequency and the data frequency are identical to each other. A stepping frequency is generated by an oscillator 4 to provide stepping pulses SP. A current sync frequency is derived from at least one count of steeping pulses. A current sync frequency becomes a current accepted sync frequency if the current sync frequency meets certain criteria as described below. A data acquisition frequency corresponds to a current accepted sync frequency.

Figure 1:
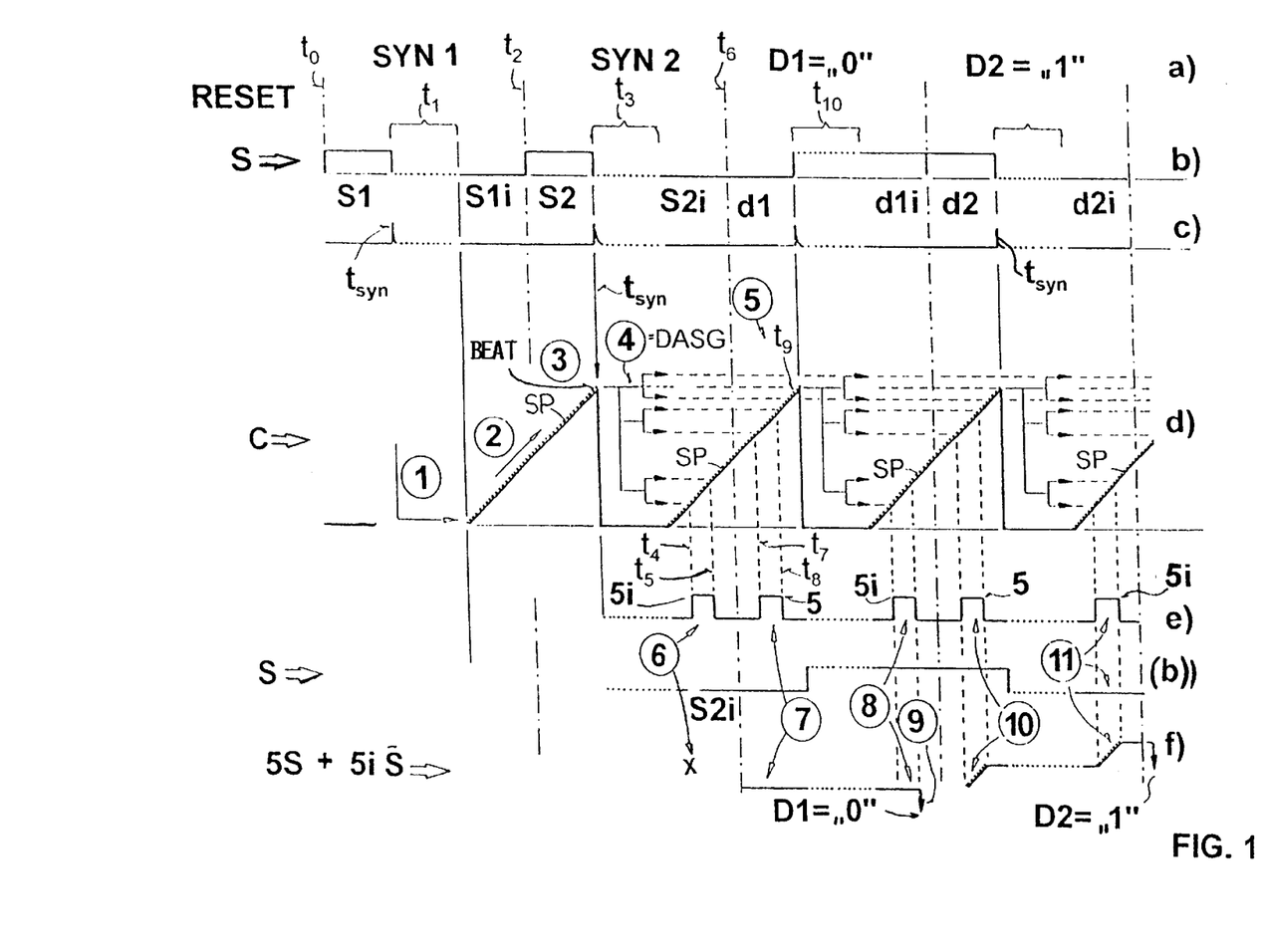
FIG. 1 is a sequence diagram representative of the digital data impulse transmission method according to the invention.
Figure 3:
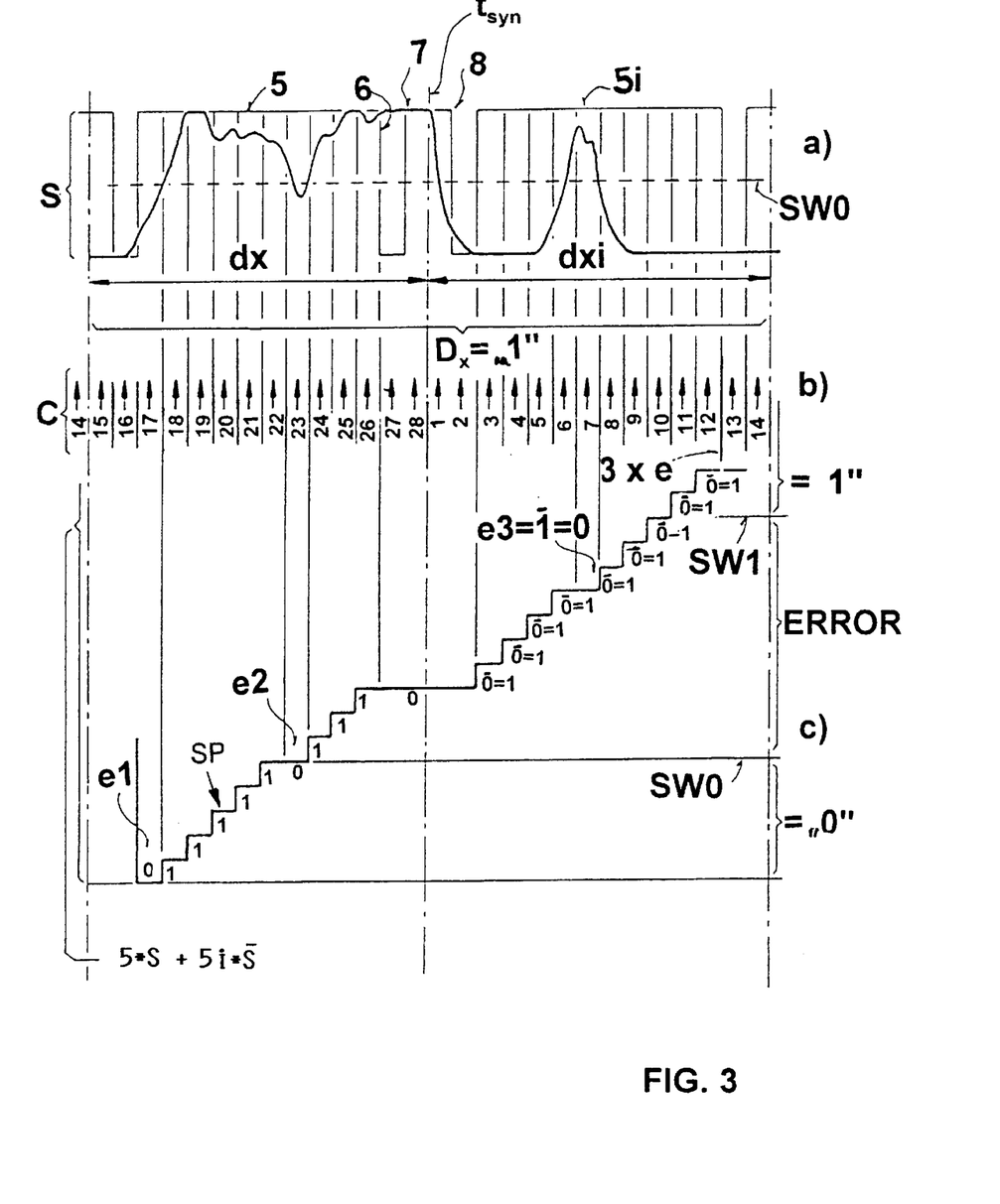
FIG. 3 illustrates the acquisition of the logic level or levels by multi-scanning or sampling in the inverted and non-inverted impulse halves of a data impulse.

FIG. 1 shows the time sequence diagrams 1a to 1f with reference to a common time base on an abscissa which is not shown in detail. The time base shows a virtual interruption in the center of each impulse. This virtual interruption of an impulse is characterized in FIG. 1 by the double or displaced occurrence of the same point of time shown for example as z,1. This virtual interruption is advantageous for visualizing certain sequences, compare for example ④ in sequence 1d in connection with the function of the data acquisition signal generator DASG. This virtual interruption shown in FIG. 1 is not real however, only its function is shown in FIG. 1. In FIG. 3 a real signal S is shown without any virtual interruption.

The sequence 1a in FIG. 1 shows the type of impulse that has been transmitted. SYN1 and SYN2 are synchronizing impulses. D1, D2 are data impulses. The transmission begins following a reset with the sending of two synchronizing impulses SYN1 and SYN2. A number of data impulses D follow the synchronization impulses. If only a single synchronization impulse SYN is used, it is necessary to forego the sampling or scanning of the first half of the first data impulse D1. The logic signal level is basically ascertainable from the scanning or sampling of but one impulse half.

The sequence 1b shows the level of the transmitted signal S. Each impulse is coded in the Manchester fashion and thus comprises an inverted impulse half and a non-inverted impulse half.

The inverted impulse half designations are provided with an "i" to distinguish from the non-inverted impulse half designations. Thus, for example s1i is the inverted impulse half of the first synchronization impulse s1.

The sequence 1b shows the virtual interruption, for example at t1, t3, . . . ,t10 quite clearly. The virtual interruption always takes place immediately following the impulse flank change in the center of each impulse. The sequence 1b also shows that with the Manchester encoding an impulse flank change always takes place at the center of an impulse. Stated differently an impulse change always does not take place at the beginning or at the end of an impulse. Thus, s2i=0 is followed by d1=0. However, d1i=1 is followed by d2=1. A synchronization at the beginning or at the end of each impulse is thus not possible.

From the sequence 1c the synchronization points of time $t_{syn}$ derived from the impulse flank changes of the signals S. These synchronization points of time $t_{syn}$ are now positioned centrally within each of the impulses.

The sequences 1d to 1f show what is taking place within the data acquisition signal generator DASG, whereby the sequence 1d represents the counting of the stepping pulses SP in a counter C. The stepping pulses SP are generated by an oscillator 4 shown in FIG. 4. The stepping pulses SP are shown as small teeth along rising lines in FIG. 1, sequence 1d. The rising lines indicate an upcount. Sequence 1d further shows the derivation of data acquisition thresholds from counter values counted by a counter C shown in FIG. 4. The sequence 1e shows scanning or sampling windows derived in response to or dependent on the synchronization points of time $t_{syn}$ and in response to a current sync frequency. Sequence 1f represents a level value counter which links or meshes the signal S with the scanning windows in accordance with the formula 5●S+5i●S̄. This linking takes place in dependency on the instantaneously current impulse half that is either inverted or not inverted.

The above mentioned sequences have been marked in FIG. 1 with numbers in a circle for facilitating the following explanation.

① At the time t1, when the digital signal S goes through a flank change for the first time, the counter C is reset and started for counting oscillator generated stepping pulses SP.

② The counter C advances or steps up with its count by one step for each stepping pulse SP. The stepping frequency of the stepping pulses SP is distinctly higher than the pulse repetition rate or sync frequency of the signal S. For example: SP frequency=100 times the sync frequency. At the time t2 the flank of the signal S changes again. However, in this example only the falling flank change is taken into account. Thus, the rising flank at t2 does not provide a synchronization impulse and hence does not advance the counter C. It is clear from FIG. 1 that the counter C trails the actual impulse signal S (quasi) by one impulse half.

③ The next falling impulse flank takes place at the point of time t3 which is recognized as the next synchronization point of time $t_{syn}$. The current count reached in the counter C is ascertained and accepted as a current accepted sync frequency, which is preferably not expressed as cycles per second, but rather as the number of stepping pulses counted. The current count of the counter C may, before it is accepted as the current accepted sync frequency, be subject to prior logic comparing.

④ If the count in the counter C has been accepted as a current accepted sync frequency $T_{akt}$, the respective count is used as the base for deriving several threshold values as is illustrated or visualized in the virtual interruption at the point of time t3.

⑤ The threshold values as derived from the count representing the current accepted sync frequency are not shown in FIG. 1 with individual reference numbers. However, if one views additionally the scanning or sampling windows 5 and 5i shown in the sequence 1e, it becomes clear that the threshold values have the following significance:

t4: The lowest threshold is reached. The scanning window 5i begins, for example at 6.25% of the current accepted sync frequency $T_{akt}$.

t5: The counter C reaches the second lowest threshold and thereby ends the scanning or sampling window 5i in the inverted portion of syn2 (at 43.75% of $T_{akt}$).

t6: The beginning of the first data impulse D1 at time point t6 does not have any effect on the counter C.

t7: The third lowest threshold at 56.25% of $T_{akt}$ starts the scanning or sampling window 5 which is now positioned with a tolerance spacing of 6.25%●$T_{akt}$ following the actual beginning of the first impulse half d1 of the first data impulse D1 at t6.

t8: The fourth lowest threshold terminates the scanning window 5.

t9: The two uppermost threshold values limit the range of the next permissible impulse flank change which is, for example, determined at $T_{akt}$±6.25%.

t10: At t10 the next synchronization point of time occurs, see 1c, so that the value counted or accumulated in the counter C is ascertained, the new threshold values are derived from the count, and the counter C is reset and restarted as is shown in the virtual interruption at t10 analog to ④ described above.

⑥ The first scanning or sampling window 5i according to sequence 1e is still present in the inverted impulse half s2i of the second synchronization impulse syn2 and is thus not processed any further.

⑦ The scanning or sampling window 5 located in the same second counting cycle of the counter C is already allocated to the first impulse half d1 of the first data impulse D1 which is not inverted. The signal S shown in the sequence 1b is shown again at t10 for a better overview. The non-inverted impulse half d1 of the data impulse D1 occurs between times t7 and t8. Therefore, the logic level of the non-inverted impulse half is scanned non-inverted and the level counter value in the sequence 1f between t7 and t8 is not increased, particularly since it is assumed in FIG. 1 that initially the signals S is totally free of noise components.

Figure 4:
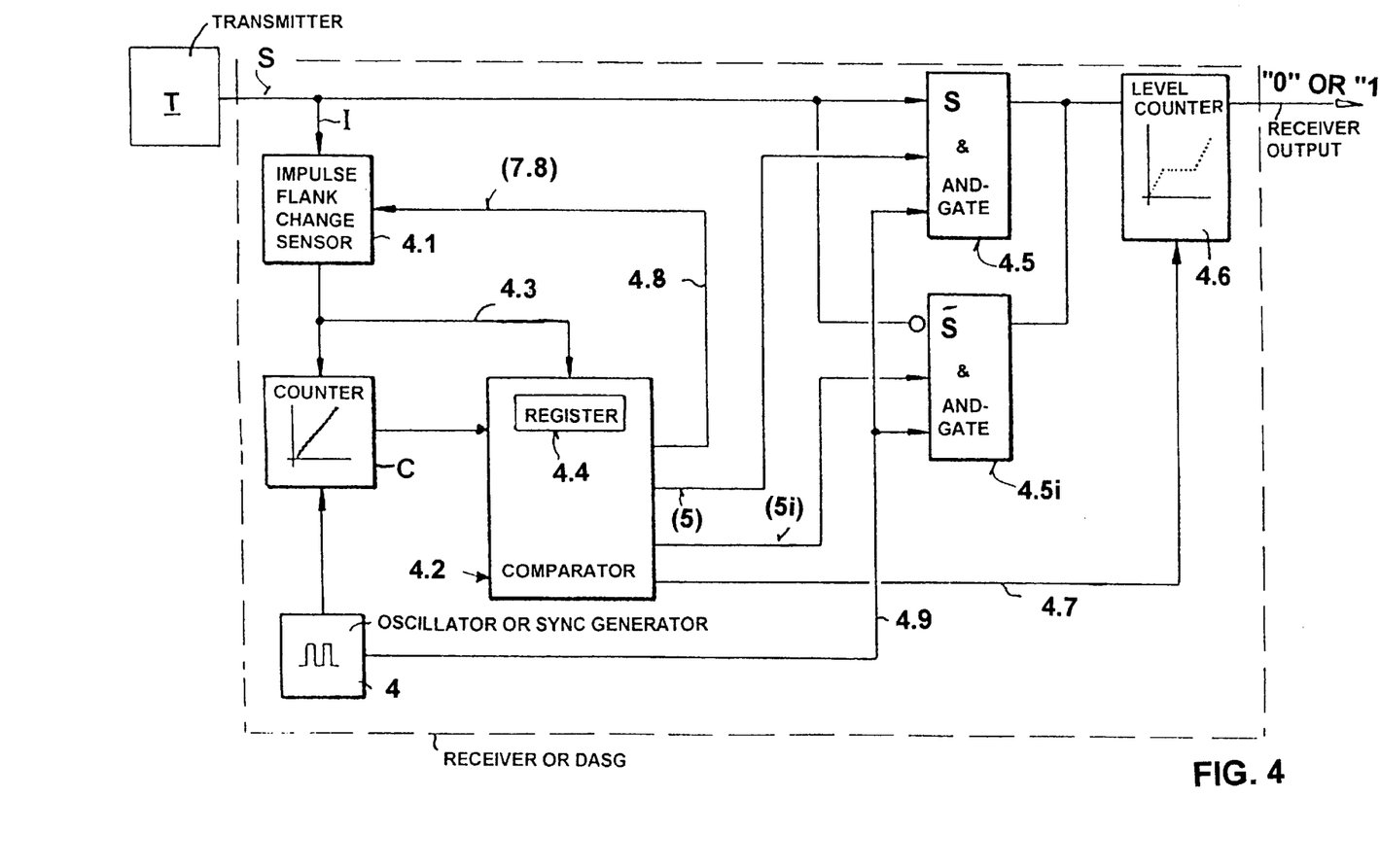
FIG. 4 is a block circuit diagram of a data impulse receiver including a data acceptance signal generator with an open loop control for performing the present method.

⑧ After the counter C has been reset at the point of time t10 when the next synchronizing point of time occurred, the counter C reaches the respective scanning window 5i in the third counting cycle according to sequence 1d which still is part of D1 for the respective inverted impulse half, in this instance d1i. Since the level counter counts only the sampling or scanning values within the scanning window 5i of the inverted signal S̄, the level count value in the level counter 4.6 in FIG. 4 is also not increased in the sequence 1f. This will be described in more detail with reference to FIG. 3.

⑨ The logic value of D1="0" is derived from the logic level counted value which at this point is zero.

⑩ The second data impulse D2 has the logic level "1" and accordingly, it assumes the high level at d2, while it assumes the low level at d2i. When scanning or sampling occurs in the scanning windows 5 and 5i, the signal level counter value in the level counter 4.6 is advanced with each stepping pulse SP causing an incremental count increase, see sequence 1f. In the scanning window 5i the impulse half d2i is inverted to the "HIGH" level and scanned as logic "1", which causes a further incremental stepping up of the level counter value in the level counter 4.6 during the scanning window 5i.

The overview of FIG. 1 shows particularly the synchronizing by counting the number of stepping pulses SP at ② in timed relationship to the impulse limits according to sequence 1a and with reference to the position of a scanning window 5 and 5i relative to its data impulse D. The overview shows that the synchronizing and the generation of the data acquisition frequency in the sequence 1d trails the signal S by one half impulse width. The scanning or sampling windows, however, are also shifted by one half pulse width in the opposite direction so that the scanning windows are again arranged synchronously relative to the data impulses. Since this shift is always dependent on the current accepted sync frequency, it is clear that this process is basically identical for each current accepted sync frequency $T_{akt}$. For example, if the current accepted sync frequency $T_{akt}$ would be twice as high, twice as many impulses would occur in the sequence 1a and the counter C would be reset already after half the time or rather half the number of stepping pulses SP by the next following synchronizing impulse $t_{syn}$. Accordingly, the threshold values according to ④ are reached twice as fast and the scanning windows 5 and 5i are produced twice as frequently.

The only limitation for varying the current accepted sync frequency is given by the fact that with a decreasing ratio between the number of stepping pulses to the sync or data frequency, the number of stepping pulses SP occurring during the time between two sync times decreases. As a result, the relative error occurring from the counting of stepping pulses, that is their whole number, presents itself as an error of quantization.

By using the impulse flank change at the center of each Manchester encoded data impulse, it becomes additionally possible to put the counter C through a follow-up or intermediate synchronization at each synchronizing point of time and thus quasi with each data impulse. However, the intermediate synchronization extends always over two consecutive impulse halves due to the above mentioned shift.

Figure 2:
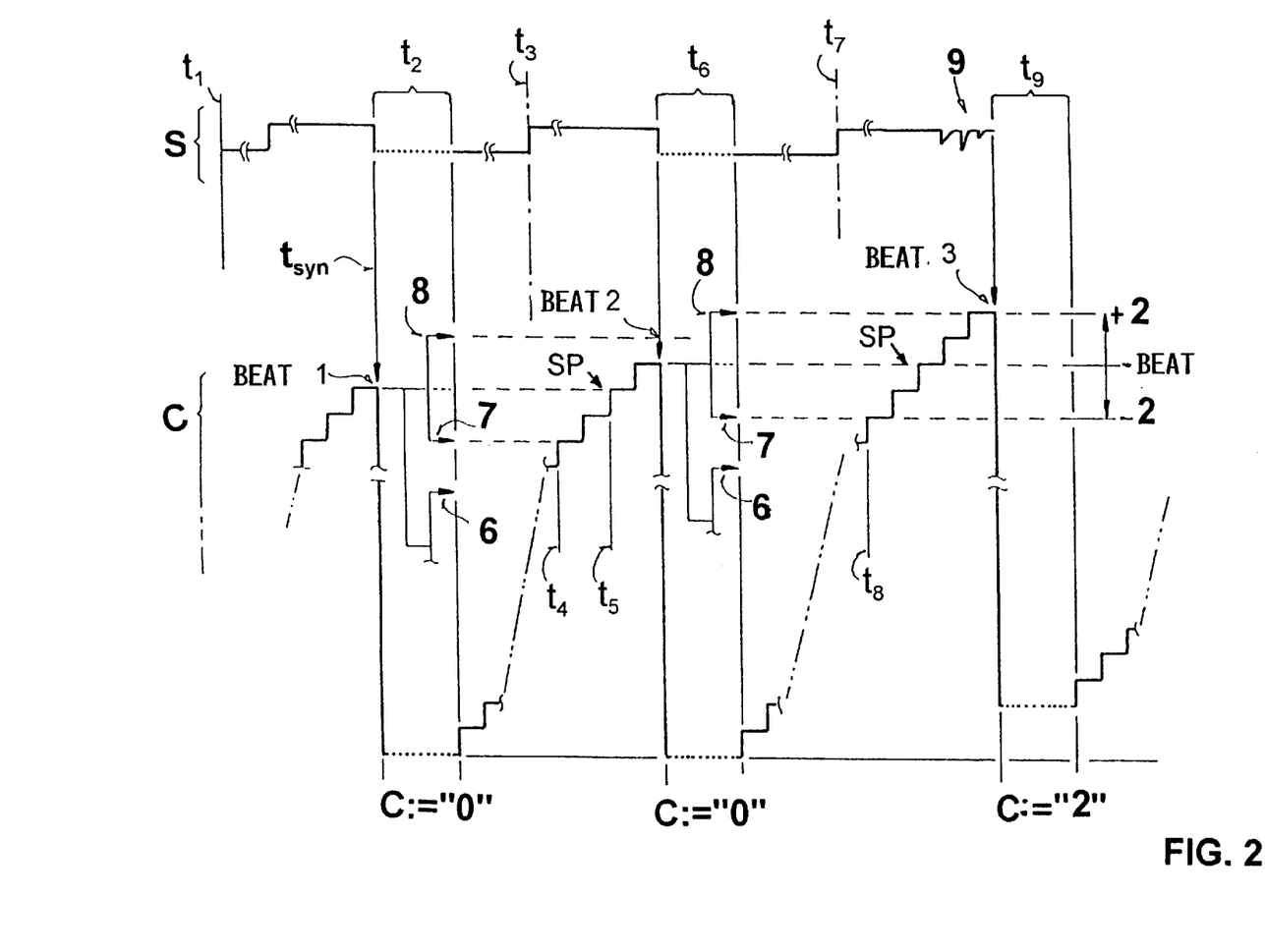
FIG. 2 is a sequence diagram illustrating particularly the details of the intermediate or follow-up synchronization of the data impulses.

FIG. 2 shows the follow-up or intermediate synchronization on the basis of the data impulses D. FIG. 2 also shows the known signal S and sections of the upcount of the counter C, however on a substantially enlarged scale compared to FIG. 1 so that the stepping of the counter by the individual stepping pulses SP is recognizable. A virtual (not real) interruption is shown in the signal S at the synchronization point of time. The sections shown are limited to the beginning and the end of each counting cycle, please compare ② in FIG. 1, because these sections are critical for the follow-up or intermediate synchronization. The adaptation of the threshold values in dependency on the current accepted sync frequency $T_{akt}$ is seen within the virtual interruption.

Viewing the signal S at the point of time t1 at which it has, for example assumed a "HIGH" level in the non-inverted impulse half of a data impulse Dx-1 (see FIG. 3), the signal S achieves a flank change at the point of time t2 to reach the now inverted impulse half with the "LOW" logic level. The flank change is undisturbed and hence recognizable as a synchronizing point of time. As a result, the actual counted value in the counter C is acquired as the current accepted sync frequency $T_{akt}$ and the counter C is reset and started again at C=0.

FIG. 2 is limited, for the sake of simplifying the illustration, to show the fourth lowest threshold 6 and the two upper thresholds 7 and 8. The threshold 6 terminates the current scanning window 5 in FIG. 1 at the point of time t8. The upper thresholds 7 and 8 limit the next permissible impulse flank change. All other threshold values are derived in an identical manner from the current accepted sync frequency $T_{akt}$. Therefore, the adaptation of the other threshold values is equivalent to the adaptation that will now be described. It is thus sufficient to just describe but one such adaptation.

Prior to accepting the current counter value in the counter C at the point of time t2 as the current accepted sync frequency $T_{akt}$, a sequence of logical testing steps may be performed. For example, by comparing the current accepted sync frequency $T_{akt}$ with known already accepted sync frequencies and the respective tolerance ranges an improved accuracy may be obtained.

Once the current or actual counter end value of the counter C is accepted as current accepted sync frequency $T_{akt}$ all thresholds are calculated anew from this accepted current sync frequency $T_{akt}$. FIG. 2 shows the thresholds 6, 7 and 8. These thresholds are, for example, obtained as percentage proportions of the current accepted sync frequency $T_{akt}$. Assuming, for example that $T_{akt1}$ is 100 pulses, then the thresholds 7 and 8, which limit the range wherein the next permissible impulse flank change may take place, are for example determined by ±2% that is 98 stepping pulses form threshold 7 and 102 stepping pulses form threshold 8, while threshold 6 is 96% of $T_{akt}$, namely 96 stepping pulses relative to $T_{akt1}$.

At the same time, the counter C is reset and started anew at the point of time t2 (C=0) to count incrementally the number of stepping pulses SP initially still during the inverted half of the data impulse Dx-1 and then unchanged, during the first impulse half of Dx. The flank change at Dx takes place not at the point of time t5 as expected based on $T_{akt1}$, but by one clock impulse later namely at t6. A cause for this deviation may be, for example, deviations at the transmitter and particularly a slight acceleration of the stepping pulse SP frequency so that actually not the signal S, but the counter C has changed relative to the signal S. Such changes can particularly occur in simple RC oscillators due to heat-up or aging of the circuit components.

However, since t6 is still within the thresholds 7 and 8, the actual count value in the counter C is accepted as a new current accepted sync frequency $T_{akt2}$=101 stepping pulses SP. The only thresholds shown in FIG. 2 are the thresholds 6, 7 and 8 which are now correspondingly adapted. The thresholds 7 and 8 are again determined as 98% and 102%, whereby allowance is made for a whole number count so that the thresholds 7 and 8 are shifted downwardly only by one stepping pulse, for example 98% of 101 becomes 98.98≈99. Threshold 6 with 96% of $T_{akt2}$ corresponds to 97 stepping pulses relative to $T_{akt2}$. The counter C is reset and newly started with the stepping pulses counted in incremental steps in the counter C.

Referring further to FIG. 2, it is assumed that a disturbance 9 has occurred in the now following data impulse Dx+1, for example due to fluctuations in the operating voltage. As a result, at the time t8 where an impulse flank change would be expected at $T_{akt2}$, that is at 101 stepping pulses SP, no flank change actually has taken place or such flank change is not recognizable due to the disturbance.

At the point of time t9 the counter C reaches the upper threshold 8 for the range that is permissible for the next impulse flank change. In order to avoid terminating the transmission due to disturbances 9 as operating voltage fluctuations, it is very advantageous to automatically fix a synchronization point of time when reaching the upper threshold. For this purpose the counter C is started anew, however this time with a head start value corresponding in this instance to two stepping pulses (C=2). Without such correction, the counter C would shift itself relative to the data impulses more and more, because the upper threshold is larger than the current accepted sync frequency. However, with the correction in the count, the current accepted sync frequency, in this example $T_{akt2}$, and the thresholds 6, 7 and 8 shown in FIG. 2 can be retained.

FIG. 3 shows the acquisition of the logic level by multi-scanning or multi-sampling the inverted impulse half and the non-inverted impulse half of a data impulse Dx="1". It is, however, possible to scan only once in each impulse half in order to derive the logic level value of the data impulse. However, a single scanning of each impulse half has a relatively large risk that the signal S is disturbed at the two single scanning locations. As mentioned in the above discussed European Patent Publication EP 0,813,321 it is possible to use the relatively high oscillator stepping frequency also for a multi-scanning or sampling. As described above with reference to the sequences 1e to 1f in FIG. 1, a scanning window 5, 5i is produced for each impulse half of the data impulse Dx. However, the scanning windows 5 and 5i for one data impulse Dx are positioned in two sequential counting cycles of the counter C.

In FIG. 3 the sequence 3a shows a disturbed signal S of a data impulse Dx and the scanning window 5 for the non-inverted impulse half dx and the scanning window 5i for the inverted impulse half dxi. The impulse flank change is positioned between dx and dxi within the thresholds 7 and 8 of the permissible range of the next impulse flank change. It will be noted that each of the scanning windows 5 and 5i is a little smaller or rather shorter in duration than the impulse halves. This feature has the advantage that particularly transient oscillation characteristics or a signal weakening at the impulse flank change is automatically excluded and thus do not have a disturbing influence on the signal logic level evaluation. Such disturbances could have been caused, for example by the frequency selectivity of the transmission medium and of the receiver circuit R shown in FIG. 4.

In FIG. 3 the sequence 3b shows the incremental counting by the counter C. In this example embodiment the number of stepping impulses SP is set by a stepping frequency of 28 which is a very low value for the sake of a clear illustration. Nevertheless, it is clear from the sequence 3b that especially in the center of the data impulse dx, that is at the time of a flank change, the resetting of the counter C takes place. The thresholds for the beginning and the end of the scanning window are positioned as follows. Scanning window 5 for the non-inverted impulse half dx begins at 17 stepping pulses and ends at 26 stepping pulses. The scanning window 5i for the inverted impulse half dxi begins at 3 stepping pulses and ends at 12 stepping pulses.

In spite of the already smaller scanning window 5 as compared to the width of the data impulse half dx, the signal S rose too slowly at the first scanning point, namely the stepping pulse 17 (error e1). Since the signal has risen too slowly and did not reach the intermediate threshold SW 0/1, this stepping pulse 17 is evaluated as a logic "0" and the level value in the counter 4.6 shown in FIG. 4 is not increased. The following stepping pulses 18 to 22 are recognized fault-free as a logic "1" and the signal level counter 4.6 is correspondingly advanced in increments. A second possible error e2 in the signal S is illustrated at the clock impulse 23 where the signal level falls temporarily below the intermediate threshold SW 0/1, for example due to a temporary drop in the supply voltage. The error e2 still does not result in an erroneous evaluation of the signal level due to the multisampling or multiscanning.

During the stepping pulses 27 to 2, the logic level value counting is interrupted because at this time signal disturbances are relatively high due to the level change. Additionally, at this time the follow-up or intermediate synchronization takes place, please compare FIGS. 1 and 2. In this example embodiment the comparing between the non-inverted and the inverted impulse halves dx and dxi is achieved in that the level value counting is continued, but as a downcount in an inverted manner. It is however, also possible to store in a memory the level value count that has been counted during the non-inverted impulse half and to reset the level counter 4.6 and to restart the level counter 4.6 for the inverted impulse half with the inverted signal $\overline{S}$. It would then be possible to compare the two signal level counts with each other. In FIG. 3 the comparing takes place by adding the two counts. Starting with stepping pulse 3 the inverted signal $\overline{S}$ is scanned and the signal level value at "0" is incremented since $\overline{0}=1$. At the stepping pulse 7 a third error e3 occurs, this time above the intermediate threshold SW0/1. By adding the stepping pulses the logic value of the data impulse Dx can now be derived from the level count in the counter 4.6 at the end of stepping pulse 12. The level count is compared with the lower threshold value SW0 and with the upper threshold value SW1. The lower threshold value SW0 and the upper threshold value SW1 enclose a range in which the signal level value is recognized as being in error. Additionally, it is possible to derive from the level count in the counter 4.6 the number of errors (3*e). Thus, it is possible due to the multiscanning to compensate for smaller disturbances in the signal S.

A further embodiment of the invention involves fixing the current accepted sync frequency for a number of data impulses. As shown in FIGS. 1 and 2, a deviation of the current accepted sync frequency during the follow-up or intermediate synchronization, which is based on the data impulses, is limited to the respective permissible range of the next impulse flank change. Therefore, it is possible to further significantly simplify the follow-up or intermediate synchronization. Such simplification merely requires to first determine at the beginning the current accepted sync frequency on the basis of the synchronization impulses and to derive the thresholds from the current accepted sync frequency which is then assumed to be constant for a known number of data impulses. Under these conditions it is necessary to merely perform a follow-up or intermediate synchronization of the synchronizing points of time for each data impulse.

Referring again to FIG. 1, the foregoing means that within the counting cycle ② once the current accepted sync frequency $T_{akt}$ is determined as a number of stepping pulses between t1 and t3, it is assumed that the so determined current accepted sync frequency is constant for a known number of following data impulses D1, D2, . . . . . The counted end value in the counter C at the next synchronization point t10 then does not lead to a new determination of the thresholds. In this connection it has been found to be advantageous when the known number of data impulses for which the sync frequency is assumed to be constant, is not too large, because after the end of the transmission of this known number of data impulses a new time and frequency synchronization is performed based on at least one reset and at least one synchronizing impulse. In FIG. 1, actually two synchronizing impulses are used.

Due to the synchronization exclusively on the basis of the synchronizing impulses, however, the dependency of the correct data acquisition from the correct recognition of the synchronizing points of time of the synchronizing signal, increases. Thus, it is advantageous to limit the number of known current, accepted sync frequencies, for example to two, because in that instance the two current accepted sync frequencies may be compared with a current sync frequency that has not yet been accepted. Alternatively, a current accepted sync frequency may be derived by the following procedure. First, counter C counts stepping pulses over several counting cycles and thus over a respective number of synchronizing impulses and then the counted end counts in the counter C are ascertained, then a logic comparing of these end counts among each other is made and/or a comparing is made of the end counts with the current accepted sync frequency to thereby determine a new current accepted sync frequency. This procedure reduces the risk of a disturbance or interference, particularly in the two critical synchronization impulses. Thus, for example, for a diagnostic operation a diagnostic clock frequency is provided in addition to the current accepted sync frequency. The diagnostic and sync frequencies are provided for example in a bus system interconnecting passenger protection devices, particularly control modules for airbags, belt tighteners, and so forth, with a central processing control unit.

An emergency frequency is also provided in such systems in order to trigger the passenger protection devices of a vehicle in a crash situation. The emergency frequency is twice as high or four times as high as the normal sync frequency, whereby the release time for the passenger protection devices is substantially reduced for a faster deployment.

In order to achieve a reset prior to the begin of the first synchronization impulse, several reset possibilities are provided in addition to conventional reset variants. Such resets may be accomplished in the following ways for example: keeping the level of the signal S constant, for example S="0" or S="1"; providing a separate reset signal through a separate reset conductor; or using a separate reset signal that deviates in its level from the signal level occurring during the diagnostic operation. Such deviating reset signal level will differ from the signal level used at a diagnostic procedure, preferably, a deviating reset signal level will be a "HIGH" signal level compared to the signal level used in a diagnostic procedure. With such a high level reset signal it is possible at any time during the signal transmission to cause a reset by superposing a stop sequence on the diagnostic signal, whereby the data acquisition signal generator DASG is reset and the following impulses are used as synchronization impulses for deriving a new current accepted sync frequency and a new synchronization point of time.

FIG. 4 illustrates a block circuit diagram of a receiver R including a controllable data acquisition signal generator DASG for performing the present method. The signal S which may be a sync signal or a data signal is supplied by a transmitter T to an input I of an impulse flank change sensor 4.1 which recognizes an impulse flank change and provides a respective output signal, whereby the type of flank change (rise or fall) and the point of time of the flank change is taken into account for defining a synchronization point of time and for setting a synchronization impulse. The respective signal starts the counter C anew. A head start value is set in the counter C if within the limits of the next permissible impulse flank change such a flank change was not recognizable.

The counter C is connected with its input to the output of the sensor 4.1 for setting or resetting the counter C. Further, the counter C is connected to the output of the oscillator 4 which generates stepping pulses SP to be counted incrementally between two synchronization points of time $t_{syn}$. The output of the counter C is connected to an input of a threshold value comparator 4.2 for transferring a count or counted value in the counter C to the comparator 4.2 which compares the count with thresholds for setting the scanning time windows 5, 5i by providing signals on respective conductors to AND-gates 4.5 and 4.5i. The comparator 4.2 also provides limits 7, 8 for the next permissible impulse flank change on conductor 4.8. The comparator 4.2 controls the data acquisition through conductor 4.7. The threshold value comparator 4.2 includes a register 4.4 into which the count is transferred at least once after a synchronization point of time or if desired, with each of the synchronization points of time. This transfer of an end count in the counter C into the register 4.4 takes place in response to a synchronization impulse from the flank change sensor 4.1 received over the conductor 4.3. The current accepted sync frequency is derived from the count value in the register 4.4, whereby, if desired, a comparing takes place with a current accepted sync frequency. The value stored in the register 4.4 then determines the values of the following thresholds. Additionally, the number of data impulses are counted and when a preset number of such data impulses have been counted, the register 4.4 is reset.

As mentioned above the threshold value comparator 4.2 produces the scanning time windows 5 and 5i. These windows are generated by activating the AND-gate 4.5 for the non-inverted impulse half of a data impulse and by activating the AND-gate 4.5i for the inverted impulse half of a data impulse. The AND-gate 4.5i receives the inverted impulse half $\overline{S}$. Multiple scanning or sampling then takes place in accordance with the oscillator stepping pulses supplied on conductor 4.9 from the oscillator 4 to the AND-gates 4.5 and 4.5i, whereby during each of the scanning time windows 5 and 5i one of the AND-gates 4.5 or 4.5i produces for each of the stepping pulses a "HIGH" level at its output in response to either the signal S or the inverted signal $\overline{S}$ exhibiting such a "HIGH" level. A logic level counter 4.6 is connected to the outputs of the AND-gates 4.5 and 4.5i and receives a setting or resetting signal from the comparator 4.4 through conductor 4.7. The logic level counter 4.6 ascertains the scanning windows 5 and 5i belonging to a data impulse and transmits the count as a logic level "0" or "1" to the receiver output. Preferably, the transfer of these logic output levels takes place at a synchronization point of time.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for transmitting from a transmitter to a receiver digital data impulses having two logic levels "0" and "1", said receiver including a data acquisition signal generator having a controllable data acquisition frequency, said method comprising the following steps:
   (a) Manchester encoding said data impulses so that each data impulse has a not inverted impulse half and an inverted impulse half with an impulse flank change between the two data impulse halves,
   (b) providing and Manchester encoding synchronization impulses so that each synchronization impulse has a not inverted impulse half and an inverted impulse half with an impulse flank change between the two synchronization impulse halves,
   (c) sending, prior to any data impulse transmission, at least one Manchester encoded synchronization impulse for synchronizing said data acquisition signal generator with respect to time and with respect to a sync frequency provided by said at least one synchronization impulse, which remains current for at least one data impulse next to be transmitted,
   (d) defining by each impulse flank change a synchronization time point, whereby a time duration determined by two sequential synchronization time points represents a current impulse frequency,
   (e) generating a stepping frequency to provide counter stepping pulses SP, so that said stepping frequency is larger than said current impulse frequency,
   (f) performing said synchronizing of said data acquisition signal generator by stepping a counter with said stepping pulses during said time duration to provide a count of stepping pulses,
   (g) deriving from said count of stepping pulses a current accepted sync frequency ($T_{akt}$),
   (h) deriving from said current accepted sync frequency a current data acquisition frequency for controlling said data acquisition signal generator,
   (i) scanning said logic levels of said data impulses in response to said current data acquisition frequency and said synchronization time points, and
   (j) performing a follow-up or intermediate synchronization of said data acquisition signal generator in response to deviations of said stepping frequency and/or of said synchronization time points and/or of following impulse durations of following data impulses.

2. The method of claim 1, further comprising determining from said data impulses (D) in response to said current accepted sync frequency ($T_{akt}$) for said follow-up synchronization in said data acquisition signal generator (DASG), permissible limits (7–8) for the next permissible impulse flank change and accepting as said synchronization point of time ($t_{syn}$) only those impulse flank changes that are within said limits (7–8).

3. The method of claim 2, further comprising determining whether or not an impulse flank change is present within said permissible limits (7–8) for the flank change, setting or fixing the upper limit (8) as synchronization point of time ($t_{syn}$) and providing a head start count (C=2) for the counting of said stepping pulses.

4. The method of claim 3, further comprising accepting as a synchronization point of time ($t_{syn}$) in said data acquisition signal generator (DASG) for said follow-up synchronization out of said synchronization impulse or impulses, only rising or falling flank changes, whereby an accepted synchronization impulse or impulses comprises a logic "0" or logic "1" in the respective first impulse half.

5. The method of claim 4, further comprising causing a sync frequency change by a resetting step and by at least one following synchronization impulse (syn1, syn2 . . . ).

6. The method of claim 5, further comprising presetting a number of data impulses to be transmitted following the sending of a synchronization impulse or impulses, counting said number of data impulses, and causing said resetting step when said number of data impulses has been transmitted.

7. The method of claim 1, further comprising scanning at least once the logic level of both impulse halves (dx, dxi) of a data impulse (Dx), whereby one impulse half leads an impulse flank change while the other impulse half trails said impulse flank change, and recognizing scanned logic levels as correct if these scanned logic levels are inverted relative to each other (dxi=$\overline{dx}$).

8. The method of claim 1, further comprising providing a scanning window (5, 5i) for each impulse half (Dx, Dx1) and defining a scanning window duration and its time spacing from the current synchronization point of time ($t_{syn}$) by a respective number of fixed stepping pulses, and scanning said logic level during said window duration with each stepping pulse counting during said scanning of the respective not inverted impulse half the number of "HIGH" logic levels and during the respective inverted impulse half the "LOW" logic levels which are added to the number of "HIGH" logic levels to provide a logic level sum (PZW), and deriving from said logic level sum (PZW) said logic levels of said data impulse (D).

9. The method of claim 8, further comprising providing a lower threshold value (SW0) and an upper threshold value (SW1), comparing said logic level sum (PZW) with said lower and upper threshold values for determining a logic "HIGH" level if said logic level sum (PZW) exceeds said upper threshold value (PZW>SW1), a logic "LOW" level if said logic level sum (PZW) is below said lower threshold value (PZW<SW0), and an "ERROR" if said logic level sum (PZW) is between said lower and upper threshold values (SW0<PZW<SW1).

10. The method of claim 9, further comprising deriving said lower and upper threshold valves (SW0, SW1) from said current accepted sync frequency ($T_{akt}$).

11. The method of claim 9, further comprising providing a number (e.g. two) of permissible sync frequencies for transmitting said digital data impulses (D), recognizing an error from one or more synchronization impulses (syn1, syn2, . . . ) during synchronization if a current sync frequency ascertained by counting stepping pulses (SP) between two neighboring synchronization points of time does not fall into a sync frequency tolerance range, recognizing an ascertained or derived sync frequency falling within said tolerance range as a current accepted sync frequency ($T_{akt}$), deriving said upper threshold value (SW1) and said lower threshold value (SW0) from said current accepted sync frequency for evaluating said logic level sum (PZW), and keeping said lower and upper threshold values (SW0, SW1) constant for transmitting of a number of data impulses.

12. The method of claim 1, further comprising providing a scanning window (5, 5i) for each impulse half (Dx, Dxi), defining a scanning window duration and its time spacing from the current synchronization point of time ($t_{syn}$) by a respective number of stepping pulses, determining said respective number of stepping pulses from the number of stepping pulses that represent a current accepted sync frequency between two synchronizing points of time following each other, scanning said logic level during said scanning window duration with each stepping pulse within said scanning window duration, counting during said scanning of the respective not inverted impulse half the number of "HIGH" logic levels and during the respective inverted impulse half the "LOW" logic levels which are added to the number of "HIGH" logic levels to provide a logic level sum (PZW), and deriving from said logic level sum (PZW) said logic levels of said data impulse.

13. The method of claim 12, wherein said respective number of stepping pulses defining said scanning window is a percentage of said number of stepping pulses representing said current accepted sync frequency ($T_{akt}$).

14. The method of claim 12, further comprising providing a lower threshold value (SW0) and an upper threshold value (SW1), comparing said logic level sum (PZW) with said lower and upper threshold values for determining a logic "HIGH" level if said logic level sum (PZW) exceeds said upper threshold value (PZW>SW1), a logic "LOW" level if said logic level sum (PZW) is below said lower threshold value (PZW<SW0), and an "ERROR" if said logic level sum (PZW) is between said lower and upper threshold values (SW0<PZW<SW1).

15. The method of claim 14, further comprising deriving said lower and upper threshold valves (SW0, SW1) from said current accepted sync frequency ($T_{akt}$).

16. The method of claim 14, further comprising providing a number (e.g. two) of permissible sync frequencies for transmitting said digital data impulses (D), recognizing an error from one or more synchronization impulses (syn1, syn2, . . . ) during synchronization if a current sync frequency ascertained by counting oscillator cycles between two neighboring synchronization points of time does not fall into a sync frequency tolerance range, recognizing an ascertained or derived sync frequency falling within said tolerance range as a current accepted sync frequency ($T_{akt}$), deriving said upper threshold value (SW1) and said lower threshold value (SW0) from said current accepted sync frequency ($T_{akt}$) for evaluating said logic level sum (PZW), and keeping said lower and upper threshold values constant for transmitting of a number of data impulses.

* * * * *

UNITED STATES PATENT AND TRADEMARK OFFICE
CERTIFICATE OF CORRECTION

PATENT NO. : 6,249,558 B1            Page 1 of 1
DATED : June 19, 2001
INVENTOR(S) : Fendt et al.

It is certified that error appears in the above-identified patent and that said Letters Patent is hereby corrected as shown below:

Column 4,
Line 59, before "This virtual", replace "z,1" by $-- \overbrace{t_\lambda^1} --;$ Column 5,
Line 46, after "formula", replace "5●S+5i●$\overline{S}$" by $-- 5 \bullet S + 5i \bullet \overline{S} --;$ Column 6,
Line 30, after "spacing of", replace "6.25%●$T_{akt}$" by $-- 6.25\% \bullet T_{akt} --$ Signed and Sealed this Fifteenth Day of January, 2002

Attest:

*Attesting Officer*

JAMES E. ROGAN
*Director of the United States Patent and Trademark Office*